Patented Aug. 24, 1948

2,447,610

UNITED STATES PATENT OFFICE 2,447,610

SOLID HALOGEN DERIVATIVES OF POLY-
MERIZED METHYL PENTADIENE

John D. Calfee, Westfield, and Robert M. Thomas,
Union, N. J., assignors to Standard Oil De-
velopment Company, a corporation of Delaware No Drawing. Application December 7, 1943,
Serial No. 513,294

2 Claims. (Cl. 260—93)

This invention relates to polymeric material; relates particularly to polymers of substituted pentadienes and relates especially to halogen derivatives of substituted pentadiene polymers.

It has been found possible to polymerize the alkyl substituted pentadienes and particularly those represented by the formula

$$CH_2:C(CH_3).CH:CH.CH_2R$$

wherein R is a radical of the group consisting of hydrogen, methyl and ethyl, such as 2-methylpentadiene, 1-3, or 2,5-dimethylpentadiene, 1-3, or 2-methyl, 5-ethyl pentadiene, 1-3, and the like, into high molecular weight rubber-like bodies by a low temperature polymerization reaction; the resulting polymers being of considerable structural value.

It is now found that these polymers are reactive with such material as chlorine, hydrogen chloride, terbutyl hypochlorite and the like, to yield very valuable halogen modified polymers. In practicing the invention, the polymer such as the polymer of 2-methylpentadiene, 1-3 is dissolved in carbon tetrachloride and treated with such halogen substances as gaseous chlorine, bromine and the like, to yield a resinous material of comparatively high halogen content, soluble in aromatic solvents and resembling rubber halide in many of its chemical and physical properties. Similarly, the polymer is reactive with hydrogen chloride or other hydrogen halides to yield still other valuable halogen derivatives; and reactive with ter-butyl hypochlorite and the like to yield still other halogen derivatives.

Thus the process of the present invention yields a series of new and valuable halogenation products of the polymers of substituted pentadiene. Other objects and details of the invention will be apparent from the following description.

The basic material for the present invention is broadly a low temperature polymer of a substituted pentadiene. In preparing the polymer component of the invention, a substituted pentadiene serves as the starting material. This is preferably an aliphatic substituted pentadiene such as 2-methylpentadiene-1,3 or the like. This material is cooled to a temperature below about —20° C., preferably to a temperature between —25° C. and —100° C. or even lower, to —160° C. either by a refrigerating jacket upon the reactor container, or by the direct admixture with the polyolefin of a suitable refrigerant such as liquid propane, liquid or solid carbon dioxide, or liquid ethane or liquid ethylene or even liquid methane or the like. To the cold olefinic material there is then added a Friedel-Crafts type catalyst in solution in a low-freezing, non-complex-forming solvent. The polymerization proceeds rapidly to yield the desired polymer. When the desired stage of polymerization is reached, the solid polymer is removed, brought up to room temperature and milled for such further treatment as may be desired.

For the catalyst component of the invention, practically any of the Friedel-Crafts catalysts disclosed by N. O. Calloway in his article on "The Friedel-Crafts synthesis," printed in the issue of "Chemical Reviews" published for the American Chemical Society at Baltimore, in 1935, in vol. XVII, No. 3, the article beginning on page 327, the list being particularly well shown on page 375, may be used. The Friedel-Crafts catalyst may be the simple normal halide, or may be one or more of a variety of different modifications thereof such as the oxy halide or the hydrated compound or the alkoxy compound or the like or may be a double halide.

The catalyst solvent may be any of the lower nonhalogenated or polyhalogenated alkanes of up to 4 or 5 carbon atoms which have melting points below 0° C., thereby being low freezing, or may be carbon disulfide or its analogs and homologs, or if modified Friedel-Crafts halide substances are used, may be the various lower paraffin compounds such as liquid propane, liquid butane, pentane or the like; the requirement upon the solvent being that it forms no complex with the Friedel-Crafts catalyst, is liquid at or below 0° C. and shows some solvent capacity for the Friedel-Crafts halide; saturation at 0.5% solubility being sufficient for most purposes.

The resulting polymer shows a molecular weight ranging from about 20,000 to 250,000 or higher (as determined by the Staudinger method, as published in "Die Hochmolekularen Organischen Verbindungen," H. Staudinger, page 56, printed by H. Verlag, Berlin, 1932) and may have an iodine number in the neighborhood of 322 (as determined by the Wijs method) the iodine number being determined to a considerable extent by the character of the substituent in the pentadiene.

This polymer has some of the properties of rubber, being reactive with sulfur in a curing reaction analogous in many ways to the vulcanization of rubber. The uncured material shows a softening point in the neighborhood of +125° C. and shows a substantial amount of cold flow. After curing with sulfur the cold flow is destroyed and replaced by a definite elastic limit, and a tensile strength at break ranging from 500 to 4,000 pounds/sq. in. and an elongation at break ranging from 200% to 1200%.

The character of the polymerization reaction suggests the probability that the polymerization yields a polymer having a linear chain with side chain substituents. The polymerization results in the disappearance of one of the double bonds from each molecule of polyolefin, leaving present one olefinic linkage for each diolefinic molecule and two olefinic linkages for each triolefinic molecule. Whether these linkages are in the chain or in the side substituents is not, however, yet determined.

According to the present invention, it is found that these olefinic linkages, whether in the chain or in the substituent, are quite readily reactive with a variety of chemical reagents of the halogen type.

*Example 1*

A portion of polymethyl-pentadiene having a molecular weight of approximately 33,000 was dissolved in carbon tetrachloride to make a solution of approximately 10% concentration. Chlorine was bubbled through the solution until saturation was reached; requiring approximately 30 minutes. The reaction was conducted in the laboratory in diffused light with a minimum of ultra-violet present; and in the substantial absence of ultra-violet light, the chlorine reaction occurred mostly with the olefinic linkage, a relatively small amount only of replacement of hydrogen by chlorine occurred. When the reaction was complete, the product was precipitated by the addition of alcohol (iso propyl alcohol was satisfactory) to the carbon tetrachloride solution; the polymer was separated; and dried on the steam bath. The chlorinated derivative was a solid, partaking more of the nature of a resin than of a rubber. It showed a relatively high solubility in aromatics, from which it could be recovered in the form of a film by volatilization of the solvent. Analysis of the product showed the presence of 52.55% of chlorine, whereas if the olefinic linkages only had been saturated with chlorine, the material would have contained approximately 46.0% of chlorine (thus indicating the presence of about 6% of chlorine in replacement for hydrogen removed as hydrogen chloride).

The resulting chlorine-containing material was found to be non-inflammable, although it charred upon heating to temperatures above about 200° C. The chlorine-containing polymer was not thermoplastic, the charring setting in before the melting point was reached. However, the material was readily plasticized by such materials as tricresyl phosphate, or the aromatic plasticizers and the like and when plasticized by these agents, the softening point was brought down below the charring point and the material was capable of being molded into strong, durable, satisfactory articles. In addition, the plasticized form intermixed readily with a wide range of fillers such as the mineral pigments, including whiting, barytes, lithopone, rouge, carbon black, the various chromium pigments and the like, as well as such fillers as wood flour, linters, cork dust, ground cork, fabric, either woven or felted, and the like, and when intermixed with these pigments and fillers, the material was readily molded under pressure to make other forms of equally satisfactory articles.

*Example 2*

A sample of the polymethylpentadiene was dissolved in toluene to the extent of approximately 10% concentration and the solution cooled to a temperature of −78° C. by the application of solid carbon dioxide. A stream of anhydrous hydrogen chloride was bubbled through the solution until the saturation point was reached. The solution was then removed from the cooling bath, warmed up to room temperature and the solid polymer hydrochloride was precipitated by the addition of alcohol. The solid polymer hydrochloride was separated from the liquid and milled to dryness on the warm roll mill.

The resulting polymer hydrochloride was a resinous thermoplastic solid, soluble in organic solvents generally. It was found to be reactive with sulfur in a curing reaction somewhat analogous to the vulcanization of rubber.

The amount of unsaturation left in the polymer is readily determined by limitation of the amount of hydrogen chloride added, and if the amount of hydrogen chloride added is limited to such an extent that the material is not fully saturated with the hydrogen chloride, but retains an iodine number between about 2 and 50 (reduced from the original value of approximately 322), the material retains its reactivity with sulfur and is readily cured with sulfur by the application of heat and pressure and preferably also an accelerator such as tetramethyl thiuram disulfide and the like. It may be noted that practically any amount of unsaturation can be retained in the hydrochloride merely by limitation of the amount of hydrogen chloride added to the polymer, and the amount can be varied from a quantity so small as to modify the iodine number by only minor amounts, to quantities so large as to effect complete saturation of the polymer, bringing the iodine number to zero. It may be noted further that the material is reactive with sulfur in a curing reaction if any significant amount of unsaturation is left in the polymer, amounts indicated by an iodine number as small as 2 being sufficient.

This material was particularly valuable for protective coatings, for the production of transparent films; for the impregnation of fabrics and the like. Its thermoplastic properties make it particularly suitable for molding, either in the form of a pure resin or in the presence of a wide range of fillers, including the pigments generally and various other fillers such as wood flour, ground cork, linters, fabric generally, both woven and felted, and the like, as indicated in Example 1.

*Example 3*

The polymer material is likewise reactive with the various organic hypochlorites. For this purpose a solution was prepared consisting of approximately 5% of the above-described polymer of 2 methyl pentadiene 1,3 in solution in benzol. To this solution there was then added an excess of tertiary butyl hypochlorite having the formula

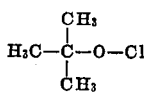

A substantial amount of heat of reaction was liberated and the material was allowed to stand until the liberation of heat of reaction ceased.

The exact nature of the reaction is still unknown but the probabilities are that the double linkage in the polymer was saturated at one end by the chlorine from the tertiary butyl hypochlorite and at the other end by the butyl alkoxide radical. Upon analysis of the compound the chlorine content, in the general neighborhood of 17% to 18%, indicated that 90% or more of the unsaturation of the polymer was saturated by the addition to the polymer of chlorine and the butyl alkoxy group.

As with the hydrogen chloride reaction in Example 2, the reaction may be limited to a part only of the unsaturation by adding to the polymer solution less than the theoretical amount of tertiary butyl hypochlorite. If the amount added is below the amount required for substantially complete saturation, the resulting compound retains a considerable amount of unsaturation as indicated by a measurable iodine number, and if this iodine number is of substantial size, ranging from 2 upward, the material retains its reactivity with sulfur in an analogous curing reaction.

The material, whether partly or wholly saturated with tertiary butyl hypochlorite, is soluble in hydrocarbons and shows a substantial effectiveness as a thickening agent for lubricants and as a viscosity index improver.

The polymer is reactive with a wide range of other halogen-containing compounds, including hydrogen fluoride, sulfuryl chloride and in fact, most of the chlorine-containing, active compounds.

Thus the process of the invention reacts a high molecular weight polymerized alkyl-substituted pentadiene with a halogen substance to convert it into a product which is solid, resinous in character, of reduced flammability and convenient softening point.

While there are above disclosed but a limited number of embodiments of the process and product of the invention, it is possible to provide still other embodiments without departing from the inventive concept herein disclosed, and it is therefore desired that only such limitations be imposed upon the appended claims as are stated therein or required by the prior art.

The invention claimed is:

1. In the method of preparing a resinous, non-inflammable, hydrocarbon soluble substance by forming a rubbery solid homopolymer having a molecular weight in excess of 20,000 by polymerizing 2-methylpentadiene-1,3 at a temperature between —10° C. and —160° C., by the application thereto of a Friedel-Crafts catalyst dissolved in a non-complex forming halogenated alkane of 1 to 5 carbon atoms per molecule which is liquid at the polymerization temperature, the improvement comprising dissolving the rubbery homopolymer in a solvent selected from the class consisting of benzene and toluene, and adding to this solution a halogen-containing substance selected from the group consisting of chlorine, bromine and hydrogen chloride to saturate at least a portion of the double bonds present in the homopolymer and thereby to form a resinous, hydrocarbon soluble solid substance capable of being formed into films.

2. A non-inflammable, hydrocarbon soluble solid homopolymer of 2-methylpentadiene-1,3 having at least a portion of the double bonds saturated with a halogen and prepared by a process comprising polymerizing 2-methylpentadiene-1,3 monomer to form a rubbery homopolymer by the application to the monomer at a temperature between —10° C. and —160° C. of a Friedel-Crafts catalyst dissolved in a non-complex forming halogenated alkane of 1 to 5 carbon atoms per molecule which is liquid at the polymerization temperature, dissolving the rubbery homopolymer in a solvent selected from the class consisting of benzene and toluene, and adding to this solution a halogen containing substance selected from the group consisting of chlorine, bromine and hydrogen chloride, the resulting halogenated homopolymer being capable of being formed into films.

JOHN D. CALFEE.
ROBERT M. THOMAS.

REFERENCES CITED

The following references are of record in the file of this patent:

UNITED STATES PATENTS

| Number | Name | Date |
|---|---|---|
| 1,898,522 | Bock | Feb. 21, 1933 |
| 1,980,396 | Gebauer-Fuelnegg | Nov. 13, 1934 |
| 2,005,320 | Konrad | June 18, 1935 |
| 2,072,255 | Gebauer-Fuelnegg | Mar. 2, 1937 |
| 2,142,980 | Huijser | Jan. 3, 1939 |
| 2,291,574 | Gleason | July 28, 1942 |
| 2,292,737 | Blomer | Aug. 11, 1942 |
| 2,327,705 | Frolich | Aug. 24, 1943 |
| 2,329,486 | Rummelsberg | Sept. 14, 1943 |
| 2,356,129 | Sparks | Aug. 22, 1944 |
| 2,391,817 | Blackburn | Dec. 25, 1945 |

FOREIGN PATENTS

| Number | Country | Date |
|---|---|---|
| 264,925 | Germany | Apr. 16, 1912 |

Certificate of Correction

Patent No. 2,447,610.                               August 24, 1948.

JOHN D. CALFEE ET AL.

It is hereby certified that error appears in the printed specification of the above numbered patent requiring correction as follows:

Column 2, line 25, for the word "nonhalogenated" read *monohalogenated*;

and that the said Letters Patent should be read with this correction therein that the same may conform to the record of the case in the Patent Office.

Signed and sealed this 6th day of September, A. D. 1949.

[SEAL]

THOMAS F. MURPHY,
*Assistant Commissioner of Patents.*